Feb. 6, 1934.  S. S. RADLEY  1,946,111
CREAM SEPARATOR
Filed March 28, 1933
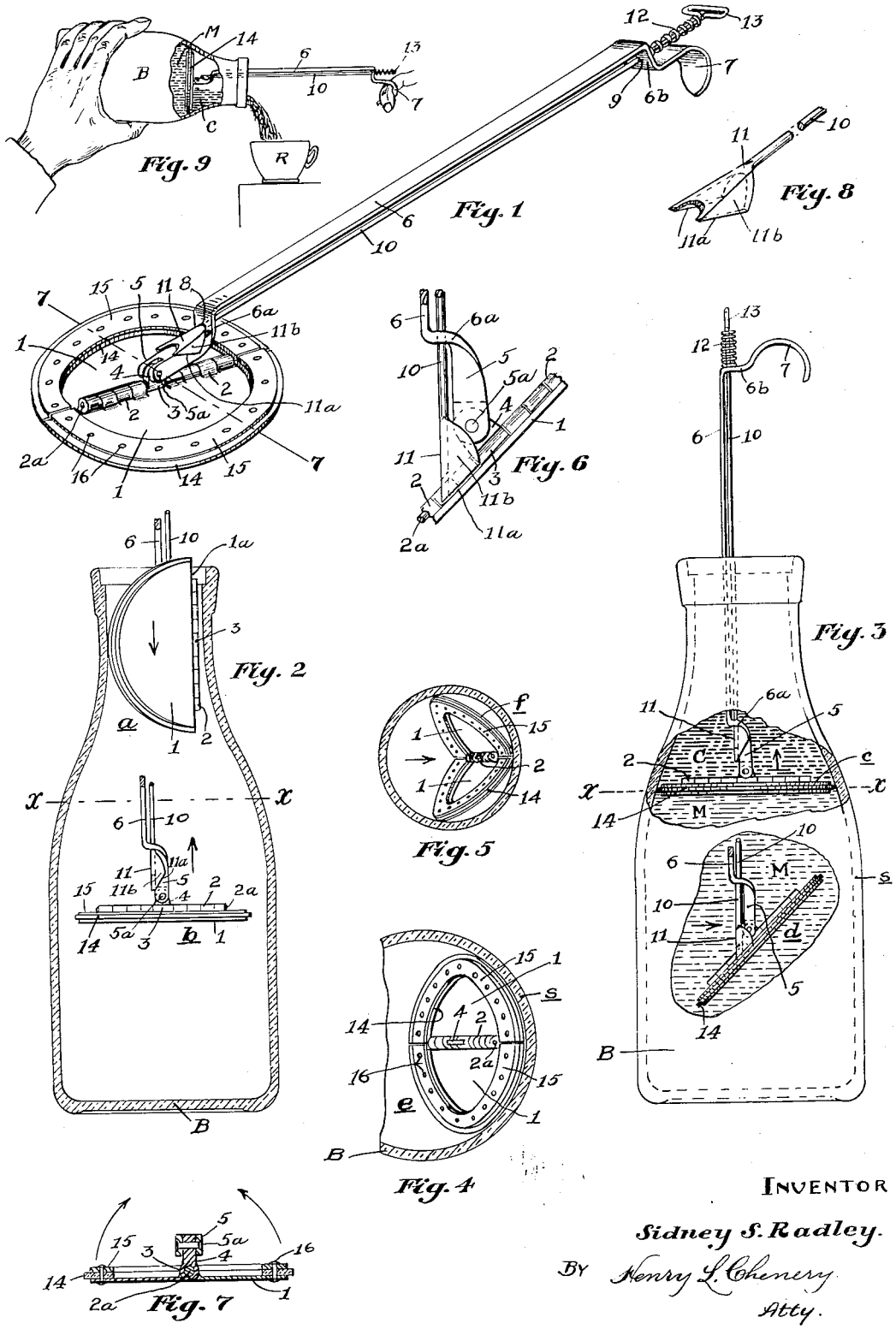
INVENTOR
Sidney S. Radley.
BY Henry L. Chenery
Atty.

Patented Feb. 6, 1934

1,946,111

UNITED STATES PATENT OFFICE 1,946,111

CREAM SEPARATOR

Sidney S. Radley, South Portland, Maine

Application March 28, 1933. Serial No. 663,186

5 Claims. (Cl. 210—51.5)

The invention hereinafter to be described relates to cream separating devices, dealing particularly with one applicable for use in the operation of removing the cream from the top of a bottle of milk.

I am aware of the fact that this has been accomplished in various ways by others who have employed a wide variety of appliances, including a siphoning method of drawing off the cream. But many of these devices are more or less difficult to keep in a sanitary state and for this reason I have elected to confine my efforts to an appliance which can be easily cleaned and sterilized and kept in a hygienic condition with the least expenditure of time and a maximum degree of assurance that the implement is not a germ-carrying one.

With this object, and others in view I have evolved a mechanical structure which positively seals the milk bottle at the cream-milk line, making it possible to then pour off the cream with the milk portion of the contents of the bottle remaining therein.

My device comprises a collapsible, shutter-like member hinged on the center line, with a rubber gasket secured to the wings of the shutter making contact on its outer circumference with the wall of the bottle.

The device is handled by a pivotally connected lever secured to the wings by a universal joint and means are provided to position the wings, when the device is to be removed from the bottle, so that they automatically collapse when the separator is raised.

There are no adjustments to be made in my appliance nor measurements to be taken to ascertain the depth of cream in the bottle as, due to the strict requirements imposed on those in the milk-handling industry by most municipalities, the cream content of the milk as well also as the size and shape of the bottles are standardized. Thus when my separator is inserted in a bottle of milk and raised to the sealing line it is a foregone conclusion that the sealing line is substantially coincident with the cream-milk line.

The character of the invention may best be understood by reference to the description found in the following specification when taken in connection with the accompanying drawing disclosing an embodiment which, at the present time, I consider preferable to other possible forms in which the invention might be carried out.

In the drawing,—

Fig. 1 is a view in perspective of my cream-separating device;

Fig. 2 shows the device in collapsed form being inserted in the neck of a milk bottle, and also shows it extended and ready to raise into the sealing position;

Fig. 3 shows the separator in sealing position; also in inclined position preparatory to removing it from the bottle;

Fig. 4 is a plan view showing the separator advanced to another position in the removal operation;

Fig. 5 shows it still further advanced, outwardly;

Fig. 6 is a view, on a somewhat larger scale, of the shutter-tilting mechanism;

Fig. 7 is a section on line 7—7, Fig. 1;

Fig. 8 is a perspective of the tilting plunger, and

Fig. 9 illustrates the application of the separator.

Similar reference characters identify like parts.

Referring to the drawing, 1, 1 are semi-circular shutter plates joined on their straight, central edges by a long hinge 2 having a hinge pin 2a on which is revoluble mounted a hub member 3 extending from which is a lug or standard 4.

Pivotally secured to member 4 is the forked end 5 of the operating handle 6, the pivoting pin 5a being disposed at a right angle to pin 2a, thus providing a universal joint between the handle and the plates. On the outer end of handle 6 is a finger hold 7 and offset portions 6a and 6b have holes 8 and 9, respectively, which serve as bearings for the rod 10.

On the inner end of rod 10 is a tilting plunger 11 held in retracted position by the helical spring 12 but susceptible of being advanced when pressure is applied to the head 13, the plunger being shown in its advanced position in Figs. 3 and 6. The sides of the plunger are obliquely cut, as at 11a.

The straight edges 1a of the plates 1 closely abut when flat-wise aligning, as shown in Fig. 7; and as their pivotal point is above their upper surface they can swing in one direction, only,—that is, upwardly as depicted in Fig. 7.

It will be observed that the sides 11b of the plunger straddle the forked end 5, holding the plunger at all times square with the axis of the lug 4.

On the top side, marginal portions of each of the wing plates 1 is a semi-annular shape strip 14, which preferably I make of rubber but which can be constructed of any yielding material suitable for joint sealing purposes, and superimposed on the rubber strips are semi-annular plates 15, respectively, these plates being employed to secure the rubber to the wings by means of the rivets 16.

In Fig. 2 the separator is shown in one instance—position a, collapsed and entering the neck of the bottle B. After lowering the separator to considerably below the cream line x—x, the wings will automatically spread or open, as shown in position b of the separator.

Upon further raising the device, as for instance, to position c, shown in Fig. 3, the outer edges of the rubber strips will contact with the wall of the bottle on the cream line x—x, thus dividing the cream C from the milk portion M.

By maintaining a slight outward tension on the finger-hold 7 to keep the wings in sealed position by their engagement with the sides of the bottle, the latter may be tipped and the cream poured into any receptacle R, as illustratively depicted in Fig. 9.

After the bottle has been emptied of the cream the separator is removed from the bottle in the following manner.

First, lower the device from the sealing position c and while lowering advance the tilting plunger 11 by applying pressure on the head 13. This will arrange the wings as shown in position d. Next move the wings, still in their inclined position, toward the side s of the bottle and when in contact with it, as illustrated in position e, raise the device by means of the handle 6.

When the upper, peripheral portions of the wings reach the narrowing diameter of the bottle they will begin to collapse and thereafter in a progressive manner continue their collapsing movements until at the neck portion of the bottle they will have been swung together or retracted sufficiently to permit of their withdrawal therefrom.

Positions d, e, f and a show, in the order given, the successive steps to be taken to remove the separator from the milk container.

It will be noted that the sides of the tilting plunger straddle the hinge portion 2 and contact with the wing plates outwardly of the pivotal point 5a of the forked end 5, thus forcing the wings to dip, as clearly shown in Fig. 6 and in position d of Fig. 3.

Furthermore, the plunger 11 acts not only to force the wings into an inclined position but it holds them in a plane parallel with the axis of the pivoting pin 5a, so that when the wings are disposed as shown in position e where they begin their collapsing operation, they are presented normal to the wall of the bottle and thus open evenly.

Immediately the wings have come into position e the pressure on the head 13 is relaxed, permitting the wings to swing toward each other on the pivoting pin 2a.

The device is simple in structure, can be easily kept in sanitary condition by cleaning and sterilizing and is efficient in operation. It can be inserted and removed from a milk bottle in a very few seconds of time.

What I claim is:

1. A device of the character described comprising two semi-circular plates hinged together on their straight edges, a pin in said hinge, a hub member revolubly mounted on said pin, a standard rising from said hub member, and a handle having a forked end pivotally connected to said standard, said handle adapted to swing at a right angle to the direction of rotation of said hub member.

2. A device of the character described comprising two semi-circular plates hinged together on their straight edges to form a circular disc when said plates are extended in flat-wise alignment, a flat, semi-annular shape member of yielding characteristics concentrically secured on the upper face of each of said plates, its outer peripheral portion extending diametrically, outside of that of said plate, a hub member mounted on said hinge connection and adaptable of rotation thereon, a standard rising from said hub member, a handle having a finger hold on its outer end, and a universal joint device interconnecting said handle with said hub member whereby said handle may swing in an infinite number of different directions.

3. A cream separator adapted for use in removing the cream from a bottle of milk, comprising two shutter plates of semi-circular form, a hinge interconnecting said plates at their straight edges, means whereby said plates can swing on their hinged connection on one side only of the plane in which they are disposed when in flat-wise alignment, relatively, a rotatable hub member operable on and midway of said hinge connection, a standard, having a hole therein, extending upwardly from said hub member, a forked handle pivotally connected to said standard adapted to swing in a plane parallel with the axis of said hinge connection, a tilting plunger having obliquely cut sides straddling, respectively, the sides of the forked end of said handle, and a rod extending from said tilting plunger to a point adjacent the free end of said handle and serving as means by which to advance said plunger into contact with said shutter plates.

4. A cream separator adapted for use in a milk bottle, comprising a flat, circular plate divided on its central line into two semi-circular members, a hinge interconnecting said members, a hinge pin in said hinge, a hub revolubly disposed on said hinge pin, a standard on said hub, a handle making pivotal connection with said standard whereby said handle may swing in various planes parallel with the axis of said hinge pin, a flat semi-annular shape rubber element mounted on and extending outwardly beyond the peripheral portion of each of said semi-circular members, an off-set portion on said handle, bearings in said off-set portions, a rod reciprocable in said bearings, and a bifurcated tilting plunger the ends of which are adapted, when said plunger is extended, to contact with the faces of said semi-circular members and force them into inclined positions relative to said handle.

5. A cream separator adapted for use in a milk bottle, having characteristics according to claim 4, and a spring adapted to hold said tilting plunger in a retracted position in which it is out of contact, normally, with the two said semi-circular members.

SIDNEY S. RADLEY.